US011531822B1

(12) United States Patent
Dong et al.

(10) Patent No.: US 11,531,822 B1
(45) Date of Patent: Dec. 20, 2022

(54) TRAINING MODELS AND USING THE TRAINED MODELS TO INDICATE STALENESS OF CONTENT ITEMS

(71) Applicant: Amazon Technologies, Inc., Seattle, WA (US)

(72) Inventors: Mingwen Dong, Centereach, NY (US); Sheng-Min Shih, Jersey City, NJ (US); Tapodipta Ghosh, Princeton Junction, NJ (US); Mihir Anil Joshi, Brooklyn, NY (US); Stuart Myles, Newtown, PA (US); Kun Cao, Long Island City, NY (US)

(73) Assignee: Amazon Technologies, Inc., Seattle, WA (US)

( * ) Notice: Subject to any disclaimer, the term of this patent is extended or adjusted under 35 U.S.C. 154(b) by 352 days.

(21) Appl. No.: 16/917,836

(22) Filed: Jun. 30, 2020

(51) Int. Cl.

| | |
|---|---|
| ***G06F 40/40*** | (2020.01) |
| ***G06F 16/22*** | (2019.01) |
| ***G06N 5/04*** | (2006.01) |
| ***G06N 20/00*** | (2019.01) |

(52) U.S. Cl.
CPC .......... *G06F 40/40* (2020.01); *G06F 16/2228* (2019.01); *G06N 5/04* (2013.01); *G06N 20/00* (2019.01)

(58) Field of Classification Search
CPC ...... G06N 20/00; G06N 5/04; G06F 16/2228; G06F 40/40
USPC .............................................................. 704/9
See application file for complete search history.

(56) References Cited

U.S. PATENT DOCUMENTS

| | | | |
|---|---|---|---|
| 7,788,223 B2 | 8/2010 | Liu et al. | |
| 2008/0097978 A1 | 4/2008 | Broder et al. | |
| 2017/0039485 A1* | 2/2017 | Kadav | G06F 9/5083 |
| 2019/0108288 A1* | 4/2019 | Miller | G06N 20/00 |
| 2020/0372109 A1* | 11/2020 | Frost | G06F 11/302 |
| 2020/0410390 A1* | 12/2020 | Fu | G06F 11/3466 |

OTHER PUBLICATIONS

U.S. Appl. No. 17/037,376, filed Sep. 29, 2020, Michael Garcia, et al.

* cited by examiner

*Primary Examiner* — William D Titcomb
(74) *Attorney, Agent, or Firm* — Robert C. Kowert; Kowert, Hood, Munyon, Rankin & Goetzel, P.C.

(57) ABSTRACT

A model training service of a provider network may receive content items as training data. For example, the content items may be documents with certain portions labeled as stale. The model training service may train one or more different types of models using those content items (e.g., natural language inference model, paraphrasing detection model, named entity recognition model). The model training service may then provide the model(s) to a content staleness check (CSC) service. The CSC service may receive, from a client, a request that indicates one or more content items to be checked for staleness. The CSC service may process the content items by the model(s) to generate one or more indications of staleness of the content item. The CSC service may generate a response based on the indications of staleness. For example, the CSC service may generate a document with certain portions highlighted as stale content.

20 Claims, 10 Drawing Sheets

TRAINING MODELS AND USING THE TRAINED MODELS TO INDICATE STALENESS OF CONTENT ITEMS

BACKGROUND

Search engines and various other tools provide users with easy access to documents across a wide variety of topics. Users often leverage these tools for personal and business purposes. For example, a health care worker may use a search engine to learn how to operate a new diagnostic machine. Although tools such as search engines may provide relevant documents, they cannot guarantee whether the content is up-to-date, especially in domains with rapid innovations (e.g., cloud computing, health care). Relying on outdated content can be problematic because any actions that are taken based on the outdated content may lead to suboptimal or undesired results. For example, a web developer that searches for documentation on how to customize a software application may receive technical information that may have been previously correct, but does not include the most up-to-date customizations that are available. Since content can become outdated quickly, it may be difficult for a user to determine, from multiple sources of documentation, which ones are the most up-to-date.

Figure 1:
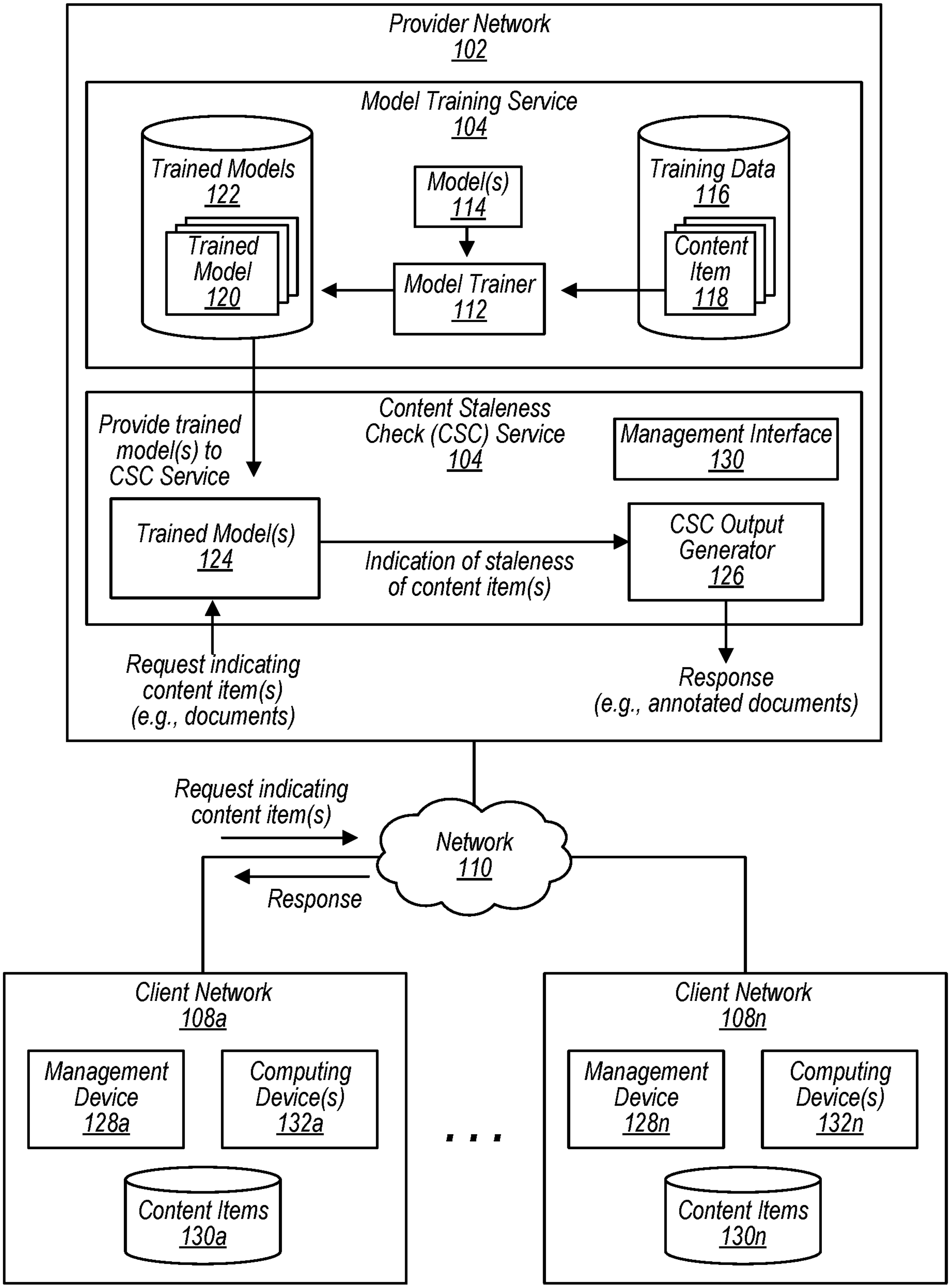
FIG. 1 is a logical block diagram illustrating a system for training models and using the trained models to indicate staleness of content items, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to train models and use the trained models to indicate staleness of content items. In embodiments, training models and using the trained models to indicate staleness of content items may allow users to quickly and accurately identify content that is stale (e.g., out-of-date) and/or content that is current (e.g., up-to-date). For example, using a content staleness check (CSC) service, outdated information in the document can be automatically detected and highlighted for clients of the service. Therefore, a client may no longer need to rely on its own users to attempt to verify whether different portions of a document are stale.

Various embodiments provide advantages over traditional techniques. For example, traditional techniques that do not leverage trained models are unable to identify that content of a document is out-of-date and that more up-to-date content is available. In embodiments, by using trained models, a CSC service may provide the most accurate and up-to-date content for any suitable topic. Moreover, in embodiments, the accuracy of the trained models may be maintained over time by updating the models with new training data.

In embodiments, a CSC service may use any number of models (and any number of different types of models) to indicate staleness of any number of content items. In an embodiment, a CSC service may use a natural language inference model, a paraphrasing detection model, and/or a named entity recognition model. The CSC service may also provide a data annotation tool to allow users to create training data (e.g., via a browser-extension). In embodiments, the client provides a collection of latest documents (or other content items) that contain up-to-date portions of content (e.g., "gold facts").

As used herein, the phrase "gold fact" may have the same or similar meaning as "up-to-date portion of content" or "up-to-date content." Similarly, the phrase "stale fact" may have the same or similar meaning as "out-of-date portion of content" or "out-of-date content." Therefore, in embodiments, a gold fact or a stale fact does not necessarily mean something that is known or proved to be true or false; rather, a gold fact or a stale fact may refer to whether a portion of content is up-to-date or out-of-date (e.g., according to content of the latest/most recent content items/documents that are published and/or verified for accuracy, which may be used to train the models to keep them up-to-date).

In embodiments, the age of a document may not necessarily affect whether it is stale or to what degree it is stale. In other words, content of the document may be up-to-date, even though the document may be many years older than recently published documents on the same topic. In some embodiments, a portion of content may be indicated as stale even though it is correct. For example, a portion of content may list three functions/features that may be performed by a web service, without listing two additional functions that were recently added to the web service. Therefore, a model that processes the portion of content may indicate that portion is stale (and in some cases, the model may also indicate the up-to-date content, which includes the two newly added functions).

In embodiments, for a given portion of unverified content, the CSC service may automatically identify two types of stale facts: 1) facts that contradict with gold facts in the latest documents; and 2) facts that are similar to labeled stale facts. In some embodiments, the natural language inference model may compare unverified facts with relevant gold facts from the latest documents and determine whether it is stale. If stale facts are provided by the client, the paraphrase detection model may find facts in a document that are similar to the stale facts. In embodiments, an annotation tool allows clients to label stale facts in documents that contradict gold facts (to further improve the model accuracy).

In some embodiments, the CSC service may be used as a back-end application programming interface (API) or as a front-end service. A back-end example for using the CSC service is to provide a content staleness score to a search engine service in order for the search engine service to re-rank search index documents so that the latest documents (least stale) are ranked higher in the search index. In other embodiments, a data analysis service may provide a content staleness check for any number of client documents (e.g., medical documents of a hospital).

In various embodiments, the CSC service may be used as a front-end service (e.g., a web frontend). For example, users of client may provide a hyperlink that links to a document, directly paste a document into a text box, or install a browser extension that allows the user to submit documents. The extracted or pasted text may be passed to the backend, where one or more models process the text. In embodiments, the CSC service may check for different types of staleness (e.g., check if content refers to a discontinued service, retired service features, and/or outdated statements). The results may then be displayed on the web frontend (e.g., which statements are outdated, which services are discontinued, and/or which procedures do not follow the up-to-date best practices). In embodiments, documents with corresponding up-to-date content are provided to the customers. The CSC service may provide users a self-served mechanism to avoid using out-of-date content and to build software applications (or any other content-based items) with more confidence. In some embodiments, the CSC service can be used to retire or flag stale content that an organization owns.

In embodiments, a model may be any type of machine learning-based model and/or neural network-based model that may by trained to identify (e.g., using language/text recognition) the meaning of one or more words/content in a content item (e.g., document or other collection of words/text) and to generate an indication of staleness of the words/content (e.g., whether the words/content is stale or to what degree the words/content is stale). In embodiments, the models described herein may be any suitable type of language processing model that may perform one or more suitable techniques in order to determine staleness of a content item and/or to generate an indication of staleness of the content item. For example, a natural language inference model, paraphrase detection model, and/or named entity recognition model may perform one or more natural language inference techniques to determine whether a "hypothesis" is true (entailment), false (contradiction), or undetermined (neutral) given a "premise." In some embodiments, the training data used to train a model (e.g., portions of content used/labeled as current/up-to-date or stale/out-of-date) may be considered the ground truth data or the gold standard data. In some embodiments, the current/up-to-date training data may be referred to as gold facts.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 10 and described below.

This specification begins with a description of a system for training models and using the trained models to indicate staleness of content items. A number of different methods and techniques to train models and use the trained models to indicate staleness of content items are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for training models and using the trained models to indicate staleness of content items, according to some embodiments.

In the depicted embodiment, a service provider network 102 includes a model training service 104 and a content staleness check (CSC) service 106. As discussed in more detail below, the model training service 104 may train any number (and any types) of models that are to be used by the CSC service.

As shown, any number of clients may use the model training service 104 and a content staleness check (CSC) service 106. For example, each of the client networks 108 may be managed by a different client. The different client networks 108 are remotely located from the provider network 102 (e.g., in a local (private) network of the client separate from a local network of the provider network). Devices within a given client network 108 may communicate with the provider network (or other networks) via a wide-area network 110 (e.g., the Internet). Different client networks may be controlled and/or owned by different clients (although in embodiments, a given client may manage more than one network).

In the example embodiment, the model training service 104 includes a model trainer 112 that trains models 114 using training data 116 that includes content items 118 (e.g., documents, phrases, or other text). As described in more detail below, a given model may be trained, using one or more content items, to determine staleness of other content items that are subsequently provided to the model for processing. For example, after one or more models are trained, the one or more trained models 120 may be stored in a library of trained models 122 and/or provided to the CSC service. The CSC service may then use the one or more trained models 120 to process content items (e.g., documents received from a client network 108) to generate indications of staleness of each of the content items.

As shown, the CSC service 106 may include any number of trained models 124 that may process one or more content items (e.g., indicated by a client request) to generate one or more indications of staleness of the content items. In embodiments, staleness of a content item indicates whether the content item is out-of-date (e.g., outdated, no longer correct). For example, the staleness of a content item may indicate that the content item is either out-of-date or is not out-of-date. In some embodiments, the staleness of a content item may indicate a degree of staleness of the content item. For example, one content item with many portions of stale content may have a higher degree of staleness (e.g., the model(s) indicates a higher content staleness score) than another content item with fewer portions of stale content (e.g., the model(s) indicates a lower content staleness score).

In embodiments, the one or more indications of staleness of a content item(s) are provided to a CSC output generator 126. The CSC output generator 126 may generate a response based on the one or more indications of staleness of the content item(s) generated by the trained models 124. The response may then be returned to the requesting client. In an embodiment, if the original request received by the CSC service included a document (e.g., web page or word processing document), then the CSC output generator may generate an annotated version of the document that indicates which portions of the document are stale/out-of-date. For example, stale words or phrases may be highlighted.

In the depicted embodiment, a client network 108 may include a management device 128. The management device 128 may be used to interact with a management interface 130 (e.g., via a graphical user interface and/or application programming interface) of the CSC service and/or the model training service to configure various aspects of the CSC service and/or the model training service. For example, a client may indicate, using the management device, the number and/or type of models to be used by the CSC service to process content items for the client. In embodiments, the client may indicate, using the management device, what type of response that the CSC output generator generates and sends to the client (e.g., annotated document, report, content staleness scores). In embodiments, the client may provide to the model training service, using the management device, any number of content items 118 to be used as training data for one or more models 114.

The client network may also include any number of locally stored content items 130 (e.g., stored on hard disks or solid state drives). For example, the content items may include a large number of medical documents and the client may want to find out which of the documents are outdated. To do so, the client may send a request to the CSC service to process the documents. The request may include any number of the documents or multiple requests may each include any number of the documents. In some embodiments, the client's documents are stored at the provider network and the client request may indicate which documents are to be processed by the CSC service.

As shown, a client network 108 may include any number of computing devices 132. In embodiments, a user may use the computing device 132 to submit requests to the CSC service and to view responses received from the CSC service (e.g., via a display). For example, a user may send a request indicating a document by pasting a link to a document into a text box of a web page or by pasting text of a document into the text box and clicking a submit button. The CSC service may obtain the text of the document and process the text (e.g., using one or more models and the CSC output generator) to generate an annotated document (indicating stale portions of content). The annotated document may then be sent to the client computing device and displayed to the user via another web page.

Figure 2:
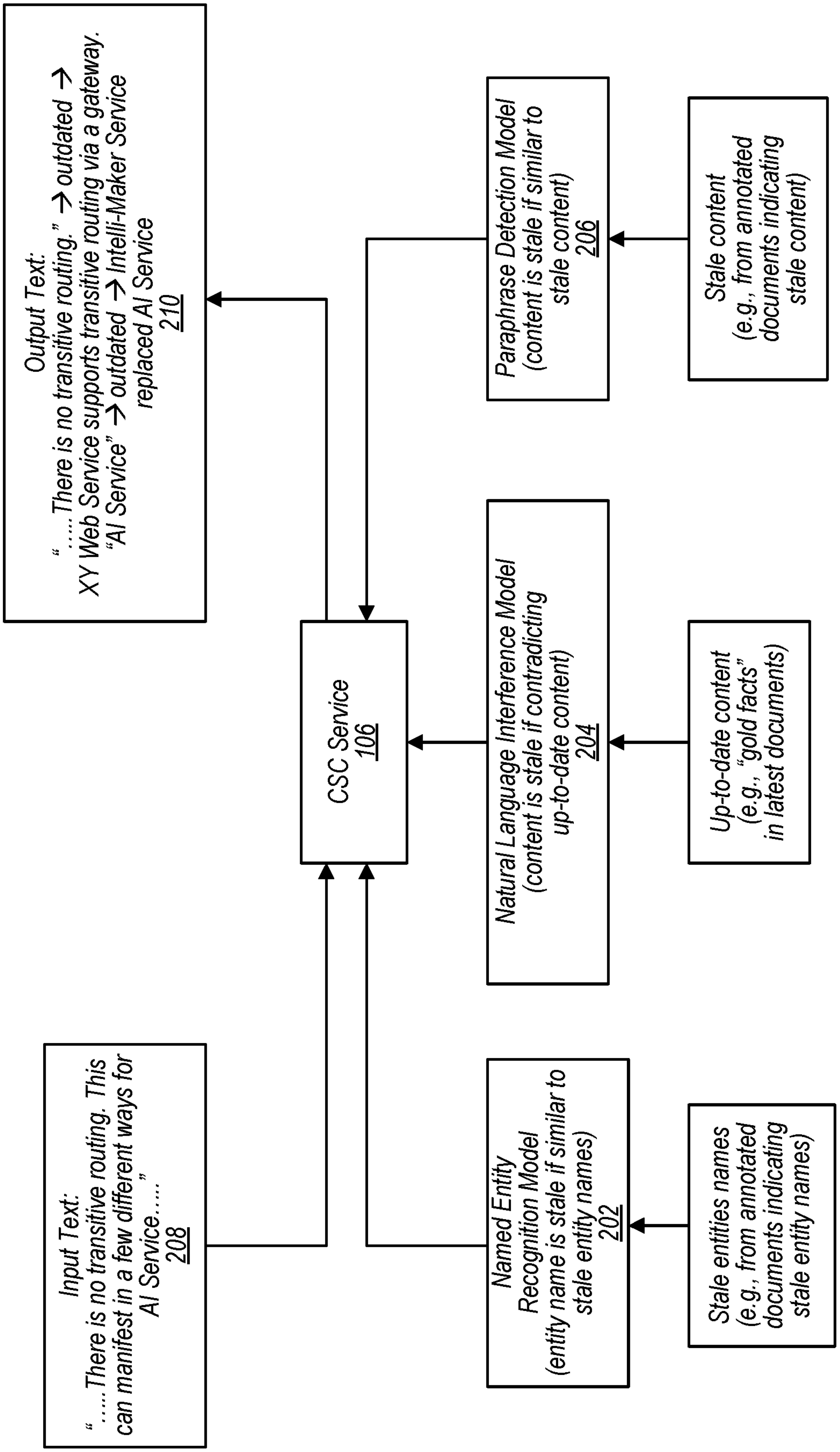
FIG. 2 is a logical block diagram illustrating the use of models by a CSC service to process input and generate output, according to some embodiments.

FIG. 2 is a logical block diagram illustrating the use of models by a CSC service to process input and generate output, according to some embodiments.

As shown, a CSC service 106 may use a named entity recognition model 202, a natural language inference model 204, and/or a paraphrase detection model 206 to process input text 208 provided by a client (e.g., as part of a document provided by the client). As shown, the CSC service may generate output text 210 based on one or more indications of staleness of the input text and sent the output text 210 to the client (e.g., for display on a device).

In the example embodiment, based on the input text "there is no transitive routing," the CSC service generates the output text "outdated" and "XY Web Service supports transitive routing via a gateway." This output may be based on indications of staleness generated by the natural language inference model or the paraphrase detection model. Based on the input text "AI Service," the CSC service generates the output text "outdated" and "Intelli-Maker Service." This output may be based on indications of staleness generated by the named entity recognition model.

In embodiments, the CSC output generator generates the output text 210 by processing the one or more indications of staleness of the input text to generate a report (e.g., summarizing and/or modifying the indications of staleness and formatting the information). In some embodiments, the one or more indications of staleness are in a suitable format and therefore can be sent as the output text 210 to the client, without any modification by the CSC output generator.

In the depicted embodiment, the named entity recognition model may be trained using stale entity names labeled in any number of content items. For example, a client (e.g., user at a client network) may label one or more entity names of a content item (e.g., document) as a stale entity name and send the labeled content item to the model training service (via the management device/management interface). To train the named entity recognition model, the model training service may identify, based on the labeling, the stale entity names of the content item (and the corresponding up-to-date entity name, if provided by the user) and train the named entity recognition model using the identified stale entity names (and up-to-date entity names, if provided). In embodiments, the trained named entity recognition model may identify an entity name as stale if the entity name is similar to any of the labeled stale entity names (e.g., within a threshold level of similarity as determined by the model). In embodiments, the trained named entity recognition model may process a content item to generate one or more indications of staleness of the content item (based on identifying one or more respective stale entity names). In embodiments, the trained named entity recognition model may also provide the corresponding up-to-date entity name for a given stale entity name (allowing the user to see the correct version of the entity name).

In the depicted embodiment, the paraphrase detection model may be trained using stale portions of content labeled in any number of content items. For example, a client (e.g., user at a client network) may label one or more portions of a content item (e.g., document) as a stale portion and send the labeled content item to the model training service (via the management device/management interface). To train the paraphrase detection model, the model training service may identify, based on the labeling, the stale portions of the content item (and up-to-date content corresponding to the stale portion, if provided by the user) and train the paraphrase detection model using the identified stale portions (and the up-to-date content, if provided). In embodiments, the trained paraphrase detection model may identify a portion of a content item as stale if the portion is similar to any of the labeled stale portions (e.g., within a threshold level of similarity as determined by the model). In embodiments, the trained paraphrase detection model may process a content item to generate one or more indications of staleness of the content item (based on identifying one or more corresponding stale portions). In embodiments, the trained paraphrase detection model may also provide the up-to-date content corresponding to a given stale portion (allowing the user to see the correct version of the content).

In the depicted embodiment, the natural language inference model may be trained using up-to-date portions of content labeled in any number of content items. In some embodiments, the up-to-date portions of a given content item may not be labeled and all of the portions of the document may treated as up-to-date portions for training purposes. In embodiments, a client (e.g., user at a client network) may label one or more portions of a content item (e.g., document) as an up-to-date portion and send the labeled content item to the model training service (via the management device/management interface). To train the natural language inference model, the model training service may identify, based on the labeling, the up-to-date portions of the content item and train the natural language inference model using the identified up-to-date portions. In embodiments, the trained natural language inference model may identify a portion of a content item as stale if the portion contradicts any of the labeled up-to-date portions (e.g., within a threshold level of contradiction or non-similarity as determined by the model). In embodiments, the trained natural language inference model may process a content item to generate one or more indications of staleness of the content item (based on identifying one or more corresponding stale portions). In embodiments, the trained natural language inference model may also provide the up-to-date content corresponding to a given stale portion (allowing the user to see the correct version of the content).

Figure 3:
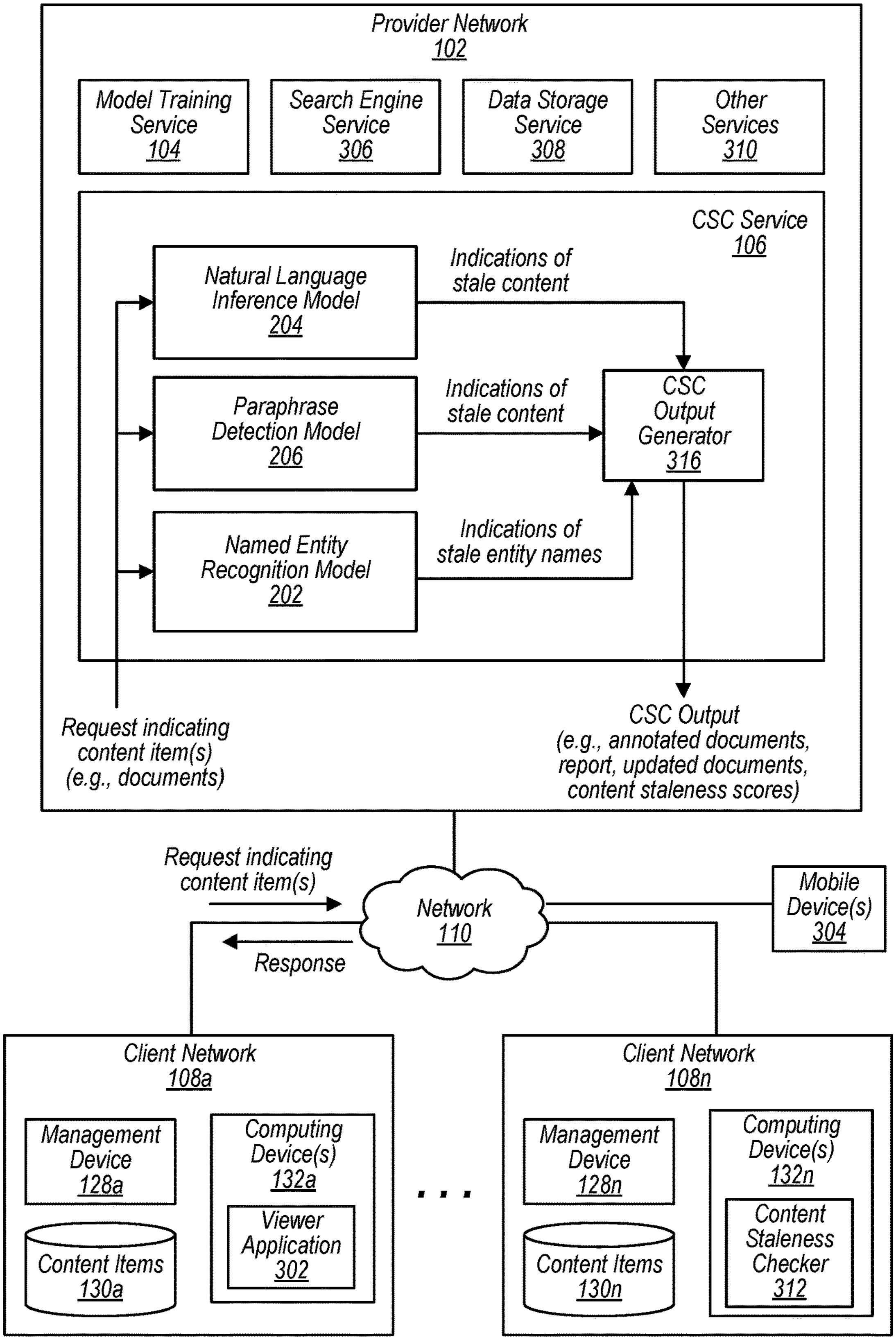
FIG. 3 is a logical block diagram illustrating a system for training models and using the trained models to indicate staleness of content items, according to some embodiments.

FIG. 3 is a logical block diagram illustrating a system for training models and using the trained models to indicate staleness of content items, according to some embodiments.

In the depicted embodiment, the CSC service uses a natural language inference model 204, a paraphrase detection model 206, and/or a named entity recognition model 202 to process a given content item. In embodiments, any combination of one or more of the above models may be used to process a given content item. Therefore, the CSC output generator may generate output based on indications from one, two, or all three of the trained models.

By using different types of models, more stale content/names may be indicated/identified than by using just one model. For example, some stale content portions may be indicated/identified by the natural language inference model but not the paraphrase detection model, and vice-versa.

In some embodiments, a weight may be applied to the output of each model to arrive at an output response. For example, an output document staleness score may be the result of applying weights to each of the document staleness scores indicated by each model. In embodiments, different (or same) weights may be applied to for each model.

In some embodiments, the output may be annotated documents (indicating the stale content and/or up-to-date content), a report (indicating one or more documents as stale or up-to-date or identifying one or more portions of each document as stale content and/or up-to-date content), up-to-date documents that include up-to-date content that corresponds to the outdated portions, and/or content staleness scores for each of the documents. In embodiments, the CSC service may add, to the report, one or more portions of up-to-date content that correspond to one or more of the portions of the document(s) identified as out-of-date (to indicate to a user the correct/up-to-date content). In embodiments, the CSC service may add, to the report, a link to one or more up-to-date documents that correspond to one or more of the documents identified as out-of-date.

As shown, the output may be sent to a viewer application 302 (e.g., a web browser). In embodiments, the output may be sent to a viewer application of a stand-alone mobile device 304 (e.g., a client device that is not a part of a local client network). In embodiments, a mobile device 304 may perform any of the functions described for the computing devices 132 of the client networks.

Figure 6:
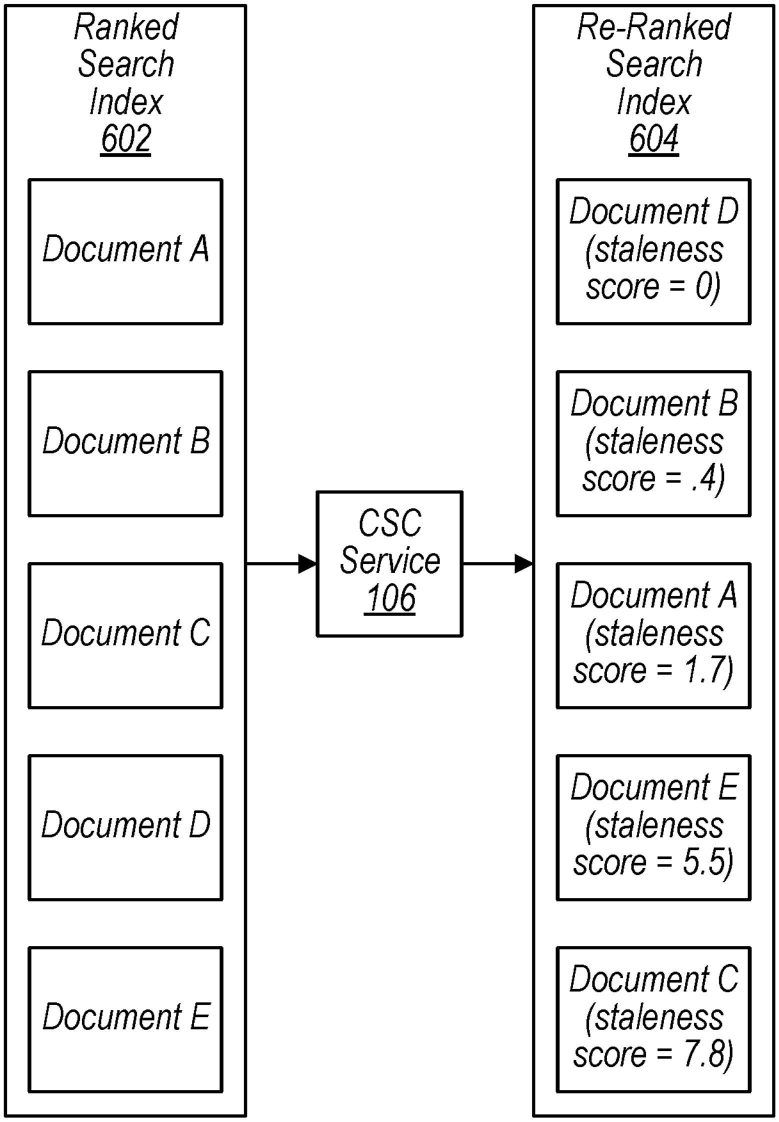
FIG. 6 is an illustration of a CSC service that re-ranks a search index based on different content staleness scores for documents as indicated by models, according to some embodiments.

In embodiments, the CSC service may re-rank a search index generated by a search engine service 306, as described in more detail for FIG. 6. In embodiments, various models, trained models, training content items, or client content items to be processed for staleness may be stored at a data storage service 308. Any number of other services 310 may be used in conjunction with the CSC service 106. For example, in some embodiments, a compute service may be used to execute some or all of the processing of content items by the models.

In various embodiments, a local content staleness checker 312 executing on a computing device(s) of a client network may perform some or all of the functionality described for the CSC service. This may allow a client to use a local computing device(s) to use models to generate indications of staleness of content items. By using a local content staleness checker, results may be received faster and less network resources may be needed to transmit results. This may also improve security by reducing exposure of data during transmission (e.g., limiting transmission of data to the local network).

Figure 4:
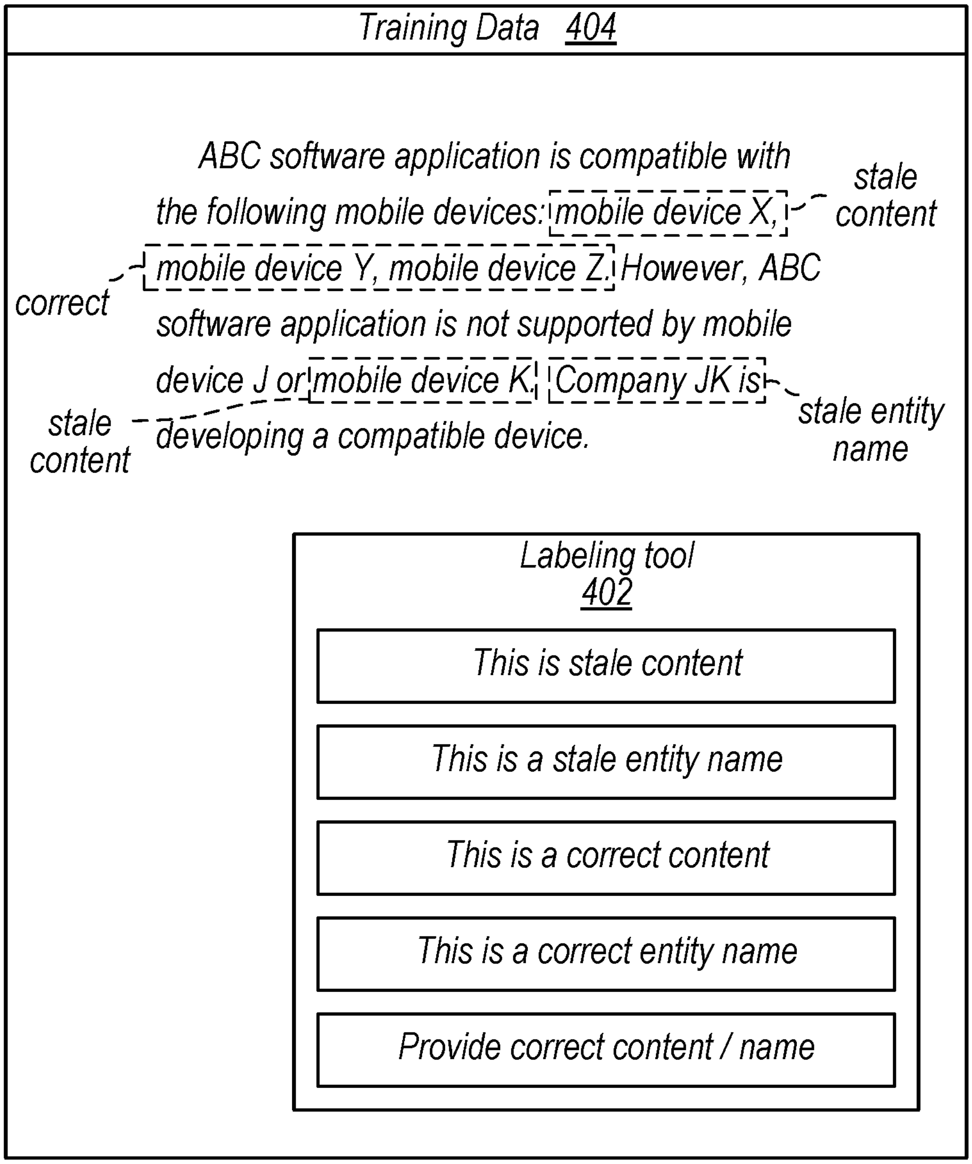
FIG. 4 is an illustration of using a labeling tool to provide training data to train models to indicate staleness of content items, according to some embodiments.

FIG. 4 is an illustration of using a labeling tool to provide training data to train models to indicate staleness of content items, according to some embodiments.

As shown, a client may use a labeling tool 402 (e.g., on a computing device 132 of a client network) to label stale portions, correct/up-to-date portions, and/or stale entity names of a content item/document that is to be used as training data 404 to train one or more models at a model training service 104. The labeling tool may include buttons that allow a user to specify selected portion of content as stale content, a stale entity name, correct/up-to-date content, and correct/up-to-date entity name. The labeling tool 402 also allows a user to provide the correct content or name for any labeled stale content/names.

In the depicted embodiment, a user labels "mobile device X" as stale content to indicate that mobile device X is not compatible with ABC software application and the user may label "mobile device Y, mobile device Z" as correct content to indicate that mobile devices Y and Z are compatible with ABC software application (e.g., labeled as up-to-date portions of content). The user has also labeled "Company JK" as a stale entity name.

In embodiments, the model training service may identify, based on the labeling, the out-of-date portions/names of the one or more content items and train the paraphrase detection model and/or named entity recognition model using the identified out-of-date portions/names. Similarly, the model training service may identify, based on the labeling, the up-to-date portions/names of the one or more content items and train the natural language inference model using the identified up-to-date portions/names.

Figure 5:
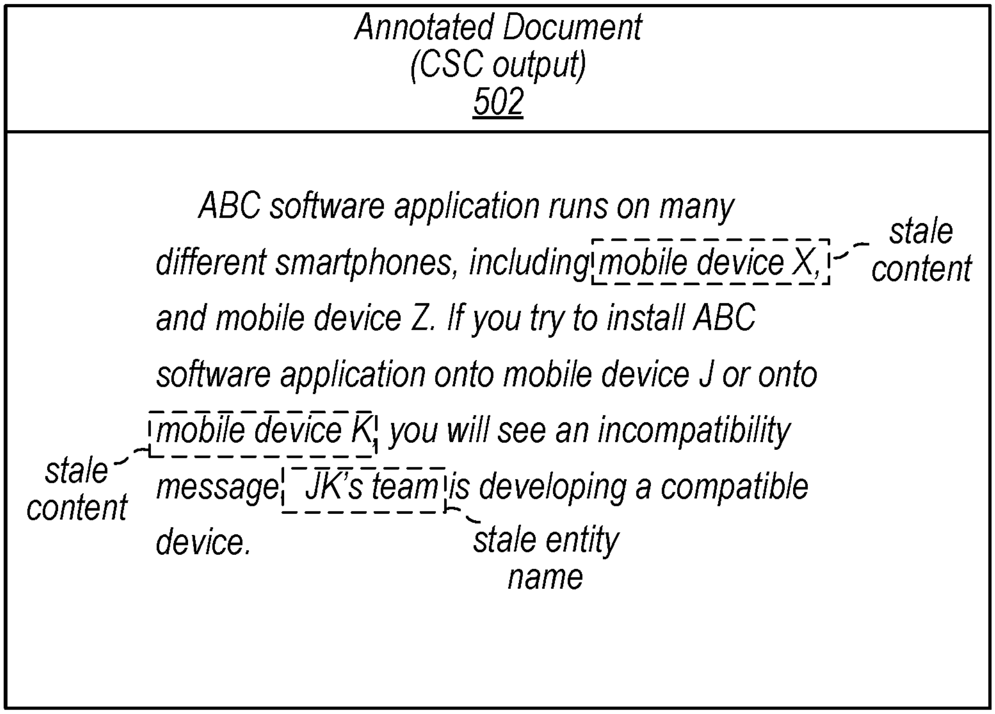
FIG. 5 is an illustration of an annotated document that is generated by a CSC service to indicate stale portions of the document, according to some embodiments.

FIG. 5 is an illustration of an annotated document that is generated by a CSC service to indicate stale portions of the document, according to some embodiments.

In the depicted embodiment, the CSC service may generate an annotated document 502 as a response to send back to a client. The annotated document may be an annotated version of a document that the user requested to be checked for staleness. As shown, the CSC service added annotations to "mobile device X" to indicate the associated content is stale (since ABC software application does not run on mobile device X). Similarly, the CSC service added annotations to "mobile device K" to indicate the associated content is stale (since mobile device K is compatible with ABC software application). Finally, the CSC service added annotations to "JK's team" to indicate the associated content is stale (since JK is an outdated entity name). In some embodiments, one or more annotations may indicate what the corresponding correct/up-to-date content/name actually is (e.g., based on client-provided training data).

FIG. 6 is an illustration of a CSC service that re-ranks a search index based on different content staleness scores for different documents as indicated by models, according to some embodiments.

In the depicted embodiment, the CSC service obtains a search index 602 (e.g., as documents A-E) from a search engine, which may include documents that are ranked in an order (e.g., from search engine service 306). In embodiments, a search index includes documents/results for a user search and/or metadata associated with each of the documents/results for the user search (e.g., documents arranged/ranked in a certain order and/or metadata associated with each document that indicates the document's ranking relative to other documents, document content, link to document, etc.). In embodiments, the CSC service processes the search index documents using one or more trained models of the CSC service to generate a content staleness score for each document that indicates a degree of staleness of the document.

To generate the response (e.g., to the client or the search engine), the CSC service re-ranks the search index according to document staleness to generate re-ranked search index 604. The re-ranked search index includes the documents that are ranked in a different order (and/or includes the metadata indicating the new ranking) based on different content staleness scores for the search index documents (e.g., 0, 0.4, 1.7, 5.5, 7.8 using a scale or 0 to 10). The CSC service then provides an indication of the new ranking of the documents to the search engine (e.g., metadata indicting the new ranking) and/or sends the re-ranked search index documents back to the search engine. In some embodiments, the CSC service may process the search index documents (e.g., each of the documents referenced by the search index) and provide a content staleness score for each document to the search engine as additional metadata that can be used by the search engine itself to index the documents (e.g., to re-rank the index according to the content staleness score of each document).

Figure 7:
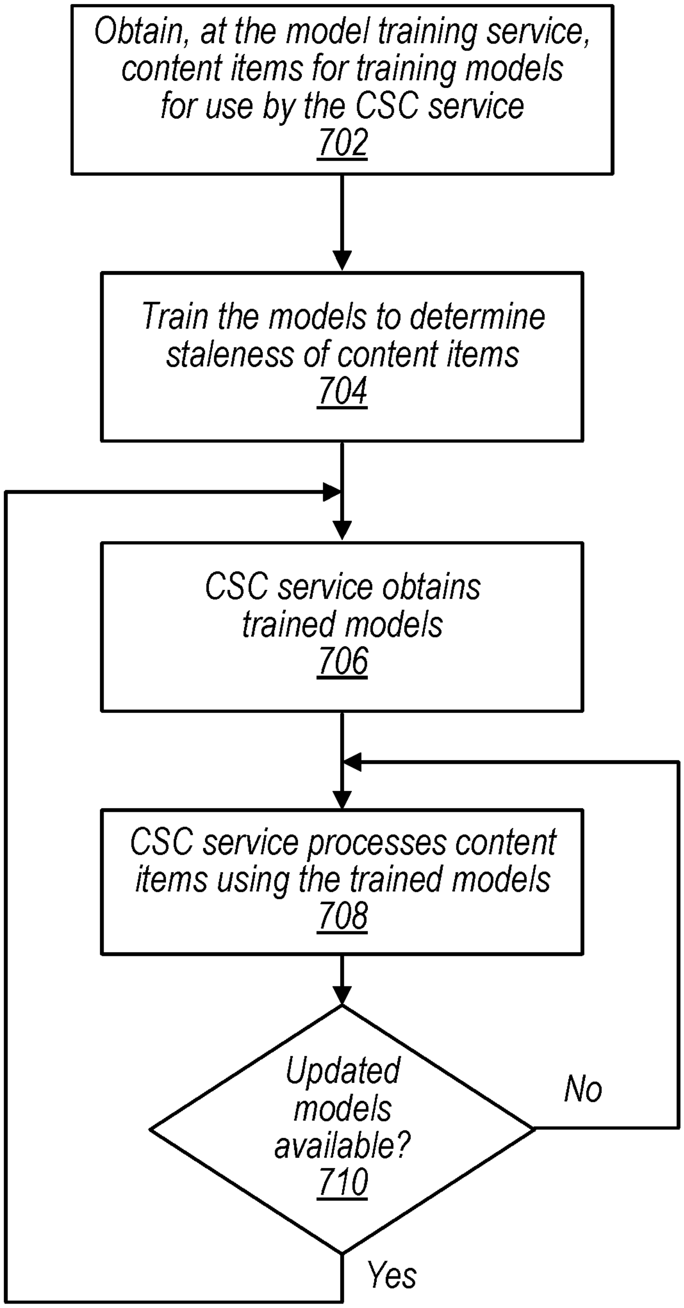
FIG. 7 is a high-level flowchart illustrating various methods and techniques to train models and update models for use by a CSC service, according to some embodiments.

FIG. 7 is a high-level flowchart illustrating various methods and techniques to train models and update models for use by a CSC service, according to some embodiments. These techniques, as well as the techniques discussed with regard to FIGS. 8 and 9, may be implemented using components or systems as described above with regard to FIGS. 1-6, as well as other types of components or systems, and thus the following discussion is not intended to be limiting as to the other types of systems that may implement the described techniques. For example, the techniques may be implemented by a CSC service of a provider network and/or a local content staleness checker of a client network.

As indicated at block 702, a model training service obtains one or more content items for training one or more models for use by the CSC service. At block 704, the model training service trains the model(s), using the content items, to determine staleness of content items (staleness of a content item may indicate whether the content item is out of date and/or to what degree it is out of date). The model training service may then provide the trained models for deployment to the CSC service (in some embodiments, the model training service may make them available to the CSC service for use and/or send them to the CSC service or other destination so that they may be used by the CSC service).

At block 706, the CSC service obtains the trained model (s). At block 708, the CSC service processes content items using the trained model(s). At block 710, the CSC service checks/determines if updated models are available (e.g., according to a periodic schedule (e.g., daily) or other schedule). If not, then the process returns to block 708. If so, then the process returns to block 706, where the CSC service obtains one or more updated models.

Figure 8:
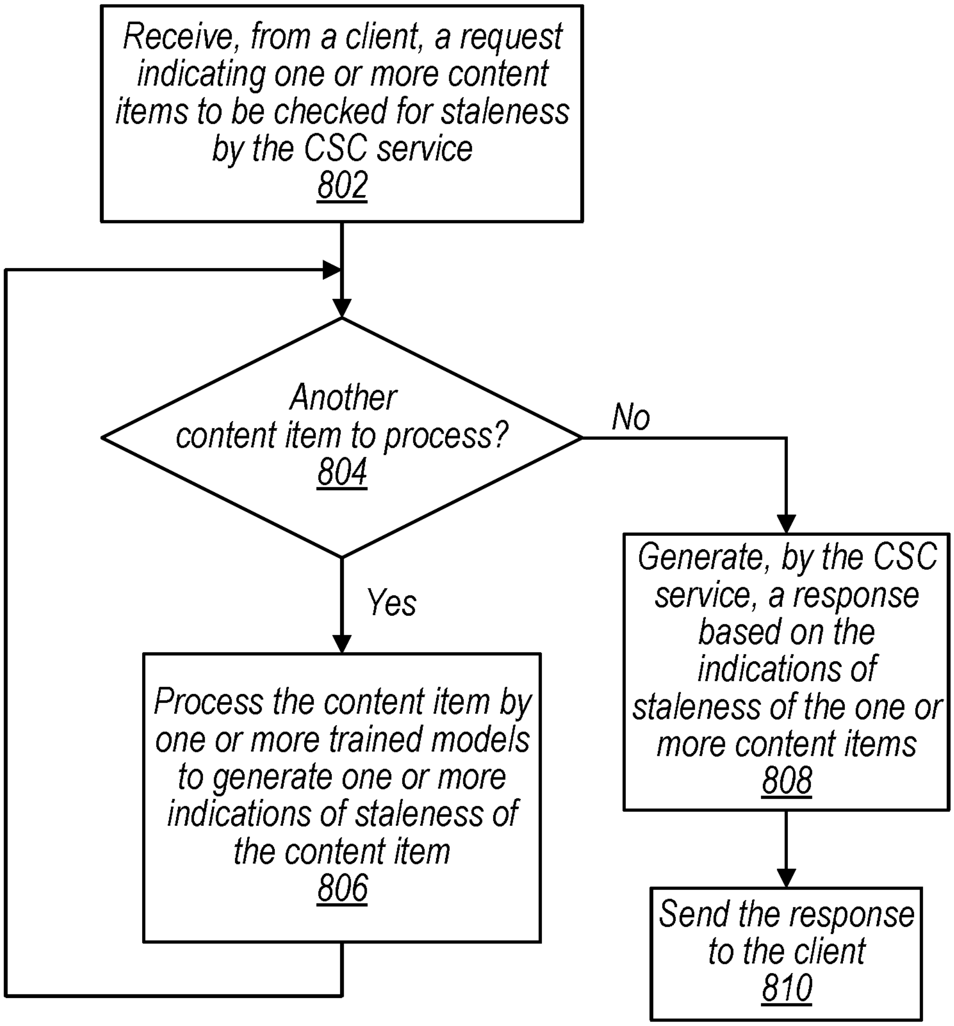
FIG. 8 is a high-level flowchart illustrating various methods and techniques to use the trained models to indicate staleness of content items, according to some embodiments.

FIG. 8 is a high-level flowchart illustrating various methods and techniques to use the trained models to indicate staleness of content items, according to some embodiments.

At block 802, the CSC service receives, from a client, a request indicating one or more content items to be checked for staleness by the CSC service. At block 804, the CSC service determines whether there is another content item to process. If so, then at block 806, the CSC service processes the content item by one or more trained models to generate one or more indications of staleness of the content item. For example, the one or more indications of staleness may include identification of one or more portions of a content item that are out-of-date/stale (or a content staleness score for the content item). The process returns to block 804.

At block 804, if the CSC service determines that there is not another content item to process, then at block 808, the CSC service generates a response based on the indications of staleness of the one or more content items. The CSC service may then send the response to a client (e.g., to a client network).

Figure 9:
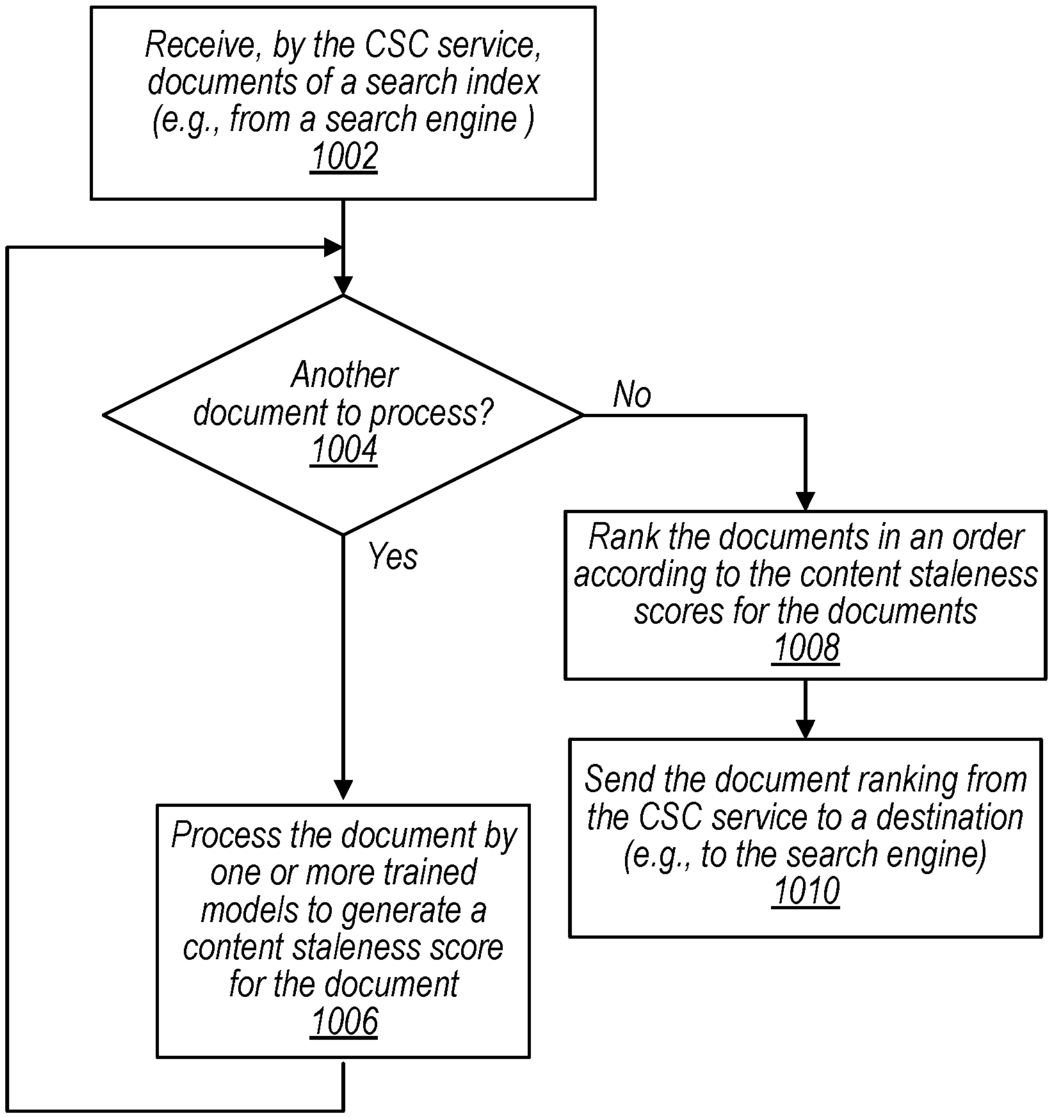
FIG. 9 is a high-level flowchart illustrating various methods and techniques to ranks search index documents based on different content staleness scores indicated by one or more models, according to some embodiments.

FIG. 9 is a high-level flowchart illustrating various methods and techniques to ranks search index documents based on different content staleness scores indicated by one or more models, according to some embodiments.

At block 902, the CSC service receives documents of a search index (e.g., from a search engine/service). At block 904, the CSC service determines whether there is another search index document to process. If so, then at block 906, the CSC service processes the document by one or more trained models to generate a content staleness score for the document. The process returns to block 904.

At block 908, the CSC service ranks (e.g., re-ranks) the documents in an order according to the content staleness scores for the documents. At block 910, the CSC service sends the document ranking (e.g., metadata indicating a different ranking) from the CSC service to a destination (e.g., the search engine/service). In some embodiments, the CSC service may send the re-ranked documents themselves or may send both the re-ranked documents and the metadata that indicates the different ranking.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of the CSC service, model training service, models, content staleness checker, provider network, client networks, and other components that implement the techniques described herein). The various methods as illustrated in the figures and described herein represent example embodiments of methods. The order of any method may be changed, and various elements may be added, reordered, combined, omitted, modified, etc.

Figure 10:
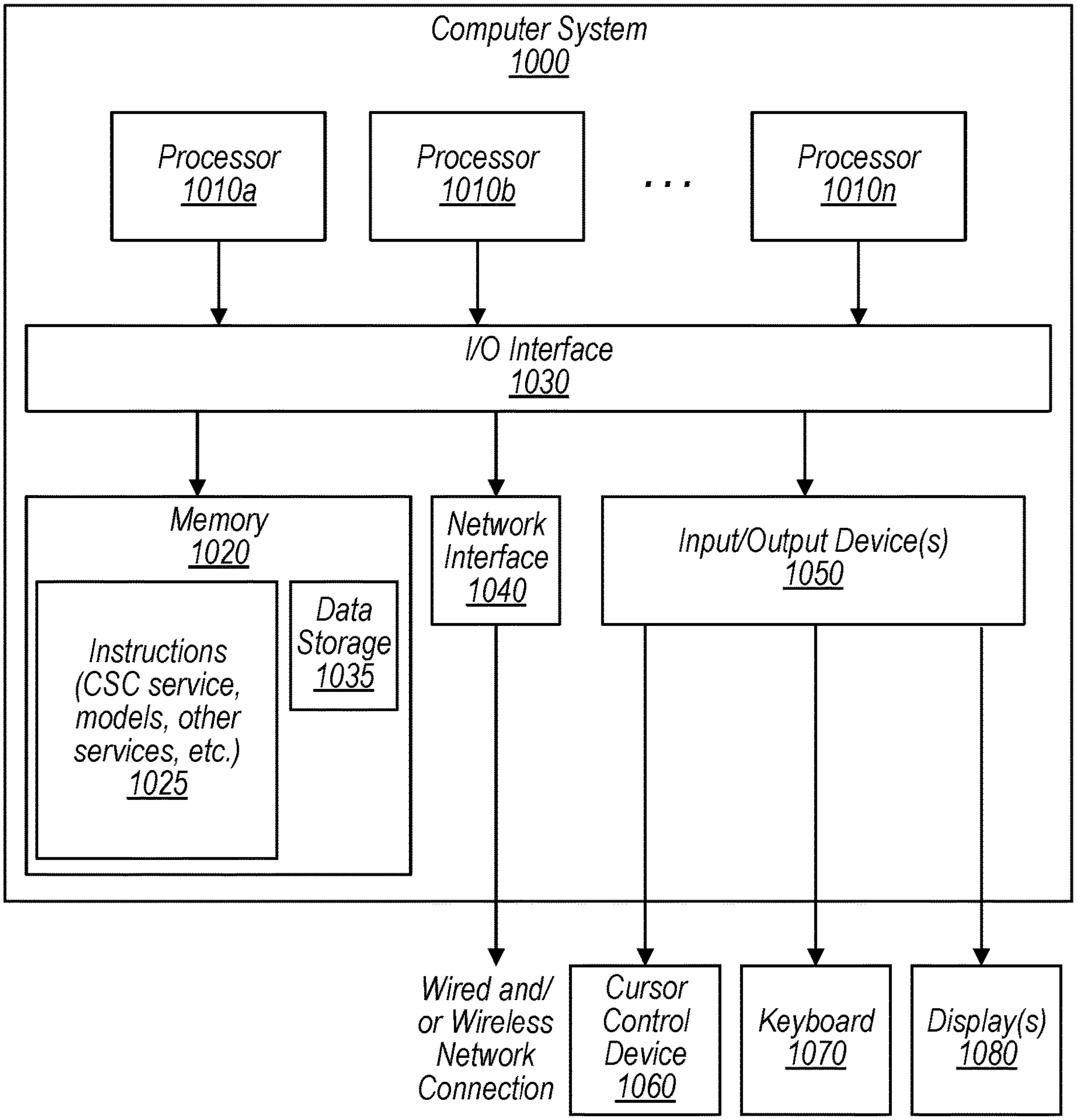
FIG. 10 is a block diagram illustrating an example computing system, according to some embodiments.

Embodiments to implement training models and using the trained models to indicate staleness of content items as described herein may be executed on one or more computer systems, which may interact with various other systems or devices. One such computer system is illustrated by FIG. 10. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., CSC service, model training service, models, content staleness checker, etc.) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments (e.g., CSC service, model training service, models, content staleness checker, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

one or more processors; and one or more memories, wherein the one or more memories have stored thereon program instructions for a model training service, which when executed by one or more processors, cause the one or more processors to:

obtain a plurality of content items for training one or more models for use by a content staleness check service (CSC service);

train the one or more models, using the plurality of content items, to determine staleness of content items, wherein staleness of a content item indicates whether the content item is out-of-date; and provide the one or more trained models for deployment to the CSC service; and one or more other processors; and one or more other memories, wherein the one or more other memories have stored thereon program instructions for the CSC service, which when executed by one or more other processors, cause the one or more other processors to:

receive, from a client, a request indicating one or more other content items to be checked for staleness, wherein for a given other content item, the CSC service is configured to:

process the other content item by the one or more trained models to generate an indication of staleness of the other content item; and generate a response based at least on the indications of staleness of the one or more other content items generated by the one or more trained models; and send the response to the client.

2. The system as recited in claim 1, wherein the one or more other content items comprise one or more documents, and wherein the indication of staleness comprises identification of one or more portions of the document that are out-of-date, and wherein to generate a response based at least on the indications of staleness of the one or more other content items, the program instructions for the CSC service, when executed by the one or more other processors, cause the one or more other processors to:

add one or more annotations to at least one of the one or more documents that identify the one or more portions of the at least one document that are out-of-date, wherein the response comprises the at least one annotated document.

3. The system as recited in claim 1, wherein the one or more other content items comprise a plurality of search index documents that are ranked in an order, and wherein the indication of staleness comprises a content staleness score for the content item that indicates a degree of staleness of the content item, and wherein to generate a response based at least on the indications of staleness of the one or more other content items, the program instructions for the CSC service, when executed by the one or more other processors, cause the one or more other processors to:

rank the plurality of search index documents in a different order based on different content staleness scores for the plurality of search index documents.

4. The system as recited in claim 1, wherein one of the models comprises a natural language inference model, and wherein to train the natural language inference model, the program instructions for the model training service, when executed by the one or more processors, cause the one or more processors to:

train the natural language inference model using one or more of the plurality of content items, wherein one or more portions of the one or more content items are up-to-date.

5. The system as recited in claim 1, wherein one of the models comprises a paraphrase detection model, and wherein to train the paraphrase detection model, the program instructions for the model training service, when executed by the one or more processors, cause the one or more processors to:

train the paraphrase detection model using one or more of the plurality of content items, wherein one or more portions of the one or more content items are out-of-date.

6. A method, comprising:

performing, by one or more computing devices:

receiving one or more content items;

processing the one or more content items by one or more trained models to generate one or more indications of staleness of at least one of the content items, wherein the one or more models are trained based on a plurality of other content items to determine staleness of content items, and wherein staleness of a content item indicates whether the content item is out-of-date;

generating a result based on the one or more indications of staleness of the at least one content item generated by the one or more trained models; and sending the result to a destination.

7. The method as recited in claim 6, wherein the one or more content items comprise one or more documents, and wherein the one or more indications of staleness of a given document comprises identification of one or more portions of the document that are out-of-date, and wherein generating a result based on the one or more indications of staleness of the at least one content item comprises:

adding one or more annotations to at least one of the documents that identify the one or more portions of the at least one document that are out-of-date.

8. The method as recited in claim 6, wherein the one or more other content items comprise a plurality of search index documents that are ranked in an order, and wherein the one or more indications of staleness of a given document comprises a content staleness score for the document that indicates a degree of staleness of the document, and wherein generating a result based on the one or more indications of staleness of the at least one content item comprises:

ranking the plurality of search index documents in a different order based on different content staleness scores for the plurality of search index documents.

9. The method as recited in claim 6, wherein the one or more content items comprise a plurality of documents, and wherein the one or more indications of staleness of a given document comprises identification of one or more portions of the document that are out-of-date, and wherein generating a result based on the one or more indications of staleness of the at least one content item comprises:

generating a report that identifies one or more of the documents as out-of-date or that identifies portions of the one or more documents as out-of-date.

10. The method as recited in claim 9, wherein generating a result based on the one or more indications of staleness of the at least one content item further comprises:

adding to the report one or more portions of up-to-date content that correspond to at least one of the portions of the one or more documents identified as out-of-date.

11. The method as recited in claim 9, wherein generating a result based on the one or more indications of staleness of the at least one content item further comprises:

adding to the report a link to one or more up-to-date documents that correspond to at least one of the documents identified as out-of-date.

12. The method as recited in claim 6, wherein one of the models comprises a trained natural language inference model, wherein the trained natural language inference model is trained based on one or more other content items that respectively comprise one or more portions that are up-to-date.

13. The method as recited in claim 6, wherein one of the models comprises a trained paraphrase detection model, wherein the trained paraphrase detection model is trained based on one or more other content items that respectively comprise one or more portions that are up-to-date.

14. The method as recited in claim 6, wherein one of the models comprises a trained named entity recognition model, wherein the trained named entity recognition model is trained based on one or more other content items that respectively comprise one or more out-of-date entity names.

15. One or more non-transitory computer-accessible storage media storing program instructions that when executed on or across one or more processors of a provider network cause the one or more processors to:

obtain a plurality of content items for training one or more models;

train the one or more models, using the plurality of content items, to determine staleness of content items, wherein staleness of a content item indicates whether the content item is out-of-date; and provide the one or more trained models for deployment to a destination, wherein the one or more trained models are configured to process other content items to generate indications of staleness of the other content items.

16. The one or more storage media as recited in claim 15, wherein one of the models comprises a natural language inference model, and wherein to train the natural language inference model, the program instructions when executed on or across the one or more processors cause the one or more processors to:

train the natural language inference model using one or more of the plurality of content items, wherein one or more portions of the one or more content items are up-to-date.

17. The one or more storage media as recited in claim 15, wherein one of the models comprises a paraphrase detection model, and wherein to train the paraphrase detection model, the program instructions when executed on or across the one or more processors cause the one or more processors to:

train the paraphrase detection model using one or more of the plurality of content items, wherein one or more portions of the one or more content items are out-of-date.

18. The one or more storage media as recited in claim 17, wherein the one or more portions of the one or more content items that are out-of-date are labeled as out-of-date portions, and wherein to train the paraphrase detection model, the program instructions when executed on or across the one or more processors cause the one or more processors to:

identify, based on the labeling, the out-of-date portions of the one or more content items; and train the paraphrase detection model using the identified out-of-date portions.

19. The one or more storage media as recited in claim 15, wherein one of the models comprises a named entity recognition model, and wherein to train the named entity recognition model, the program instructions when executed on or across the one or more processors cause the one or more processors to:

train the named entity recognition model using one or more of the plurality of content items, wherein one or more entity names of the one or more content items are out-of-date.

20. The one or more storage media as recited in claim 15, wherein the plurality of content items are documents, and wherein to obtain a plurality of content items for training one or more models, the program instructions when executed on or across the one or more processors cause the one or more processors to:

obtain the plurality of documents from a client, wherein one or more portions of a given document are labeled as an up-to-date portion, an out-of-date portion, or an out-of-date entity name.

* * * * *